Patented Oct. 19, 1954

2,692,255

UNITED STATES PATENT OFFICE 2,692,255

MODIFICATION OF ALKALI METAL CATALYZED POLYMERIZATION OF CONJUGATED DIENE HYDROCARBONS

Leonard C. Kreider, Wadsworth, Ohio, assignor to The B. F. Goodrich Company, New York, N. Y., a corporation of New York No Drawing. Application January 19, 1952, Serial No. 267,305

14 Claims. (Cl. 260—83.7)

This invention relates to the preparation of synthetic rubber polymers. More particularly the invention relates to a method for modifying alkali metal catalyzed polymerization of conjugated aliphatic diene hydrocarbons.

The polymerization of conjugated dienes by alkali metal catalysts is well known. It is also known that specific classes of organic compounds have an effect upon the course of such polymerizations. When a conjugated diene such as butadiene-1,3 in an inert solvent is polymerized with sodium alone, the reaction rate is irregular and difficult to control, and the resulting polymer product often is a mixture of tacky or syrup-like low molecular weight polymer and insoluble high molecular weight polymer called gel. When relatively small amounts of specific chamicals such as aldehydes, ketones, esters, acids, nitriles, acetylenes and other similar materials are present in trace amounts they delay or slow the course of alkali metal polymerizations, and in larger quantities inhibit it entirely. Water, alcohols, certain olefins and primary and secondary amines can be tolerated in larger amounts but exert a similar influence. Ethers, acetals, ortho-esters and tertiary amines, if purified, may be added in larger amounts, up to 10% or more, and serve to give a considerable measure of control over reaction rates and the properties of the polymer produced. However, the use of these latter compounds still does not result in entirely satisfactory reaction rates, nor in a polymer product with a useful balance of good physical properties.

I have discovered that unique and unexpected results are obtained when hydroxy ethers are used as modifiers and regulators for alkali metal catalyzed polymerizations of conjugated diene hydrocarbons. Thus, I have found that the use of small quantities of hydroxy ethers with molecular weights below 1000, and containing both a hydroxyl and ether group in the same molecule, profoundly affect both the course of the alkali metal catalyzed polymerization and the nature of the resulting rubbery polymer. Through the use of such hydroxy ethers, a polymer product resembling natural rubber in its processing characteristics is obtained.

In a preferred embodiment of the invention I may use a polymerization mixture by weight, of 100 parts of butadiene-1,3, 100 parts of an inert diluent such as pentane, 0.2 part of finely-dispersed sodium catalyst, and 0.2 part of the monoethyl ether of ethylene glycol. The polymerization reaction proceeds smoothly to yield a homogeneous rubbery polymer of gray appearance. This is to be contrasted to the formation of a mixture of clear, high viscosity gel in a sticky red syrup-like polymer of low-molecular weight found in control polymers in the absence of the hydroxy ether modifier.

The polymer product from the preferred procedure given above is a homogeneous, gel free, readily soluble rubbery product of good appearance. The rubber has superior processing characteristics on both a cold and hot two-roll rubber mill. The processing characteristics resemble those of natural rubber. This hydroxy ether modified polymer has very good physical properties. This polymer can be further distinguished from other rubbery sodium polymers by its ability to form exceedingly tough films with no evidence of graininess or hard lumps upon being stretched.

Compounds of the hydroxy ether class, both aliphatic and aromatic, may be employed in the polymerization reaction according to this invention, but the polyalkylene glycols with molecular weights below 1000, and mono-substituted ethers of alkylene or aryl glycols are to be preferred. The polyalkylene glycols used in the practice of this invention are those selected from materials of the general formula HO—(R—O)$_n$H. Those materials preferred are the polyethylene glycols with approximate molecular weights of 200, 300, 400 and 600. Illustrative examples of the polyethylene glycols are the tetraethylene glycol, the hexaethylene glycol, octaethylene glycol and the dodecaethylene glycol in which the $n$ of (R—O) is 4, 6, 8 and 12. Also included in the scope of this invention are the corresponding polypropylene and polybutylene glycols.

Illustrative mono-substituted ethers of the alkylene glycols of the preferred class may be selected from compounds having the general formula HO—R—OR'. The mono-substituted ether of ethylene glycol may be employed and may be any of the following compounds; where R' is methyl, ethyl, n-propyl, isopropyl, n-butyl, sec.-butyl, isobutyl, n-amyl, octyl, phenyl and others. Mono-substituted ethers of other alkylene glycols may be selected where R in the above formula is propylene or butylene and R' is methyl, ethyl, n-propyl, isoproply, n-butyl, sec.-butyl, isobutyl, n-amyl, isoamyl, octyl, phenyl and others. The mono-substituted ethers of diethylene glycol, triethylene, tetraethylene and other polyethylene glycols such as the methyl, ethyl, n-propyl, isopropyl, n-butyl, sec.-butyl, isobutyl, n-amyl, isooctyl, and phenyl mono-substituted ethers are also useful in the practice of this invention. Aryl hydroxy ethers included in the scope of my invention also include the monoethyl ether of resorcinol as well as other mono-substituted resorcinols such as methyl, propyl, butyl, amyl, octyl and others. In place of resorcinol other polyhydric phenols such as hexylresorcinol, catechol, hydroquinone, pyrogallol, phloroglucinol, 1,2-naphthyl hydroquinone and the like may be substituted.

Alcohols such as ethyl alcohol act as inhibitors of the polymerization reaction by destroying the sodium catalyst. Ethers as a class vary widely both in their activity and in the results they produce. For example, ethers such as n-butyl phenyl ether and dibenzyl ether give slow reaction and yield low-molecular weight syrupy polymers while the cyclic ether 1,4-dioxane, when pure, accelerates polymerization and yields polymers of high Mooney viscosity. The diethyl ether of ethylene glycol is similar to the dibenzyl ether in its activity. However, none of the ethers so far tried yield polymers equivalent to those from the hydroxy ether modified reactions of this invention.

The hydroxy ethers may be purified by distillation prior to use or may be shaken with calcium hydride and decanted. The concentration of hydroxy ether used depends upon the polymer properties desired and the molecular weight of the hydroxy ether. For example, from 0.1 to 0.5 part of the ethylene glycol mono-ethyl ether, or of tetraethylene glycol (polyethylene glycol 200) yield desirable polymers. A tougher polymer may be prepared by using the lower concentration, and softer polymers by increasing the amount of hydroxy ether used. The use of these materials makes available a sensitive technique for controlling reaction rate, polymer molecular weight and molecular distribution of alkali metal polymerizations. The hydroxy ether may be employed in concentrations from 0.05 to 2.0 parts based on the polymerizable monomers. Mixtures of the polyethylene glycols and mono-substituted ethers of ethylene glycol may be employed in the spirit of this invention.

The polymerizable butadiene-1,3 hydrocarbon used may be butadiene-1,3 itself or its homologues such as 2 - methyl - butadiene - 1,3,2,3 - dimethyl butadiene-1,3, piperylene, etc.

These butadiene-1,3 hydrocarbons may be polymerized alone in this invention or in mixtures with vinyl aryl hydrocarbons in an amount of less than 50 percent by weight. The preferred comonomer for this use is styrene in concentrations from 0-50 percent by weight. Other illustrative useful monomers of this class are vinyl toluene, ethyl styrene, divinyl benzene, and alpha-methyl styrene. Commercial grades of both monomer classes are satisfactory. The polymerization may be carried out in bulk without a diluent, or a hydrocarbon diluent may be used.

The hydrocarbon diluent employed should be an inert hydrocarbon. Those preferred are propane, butane, pentane, methyl cyclohexane, benzene, etc., or mixtures thereof. A low boiling point diluent is preferred since this makes it easy to flash the diluent off from the polymer at the end of the reaction. The relative ratio of diluent preferred is 1 to 4 times the monomers used. A greater dilution gives poorer results. The diluents used in this invention may be of technical grade.

The catalyst used in this invention is one of the alkali metals, lithium, sodium, potassium, rubidium, or cesium. Interalloys or alloys of any of these alkali metals may be employed. The preferred alkali metal is sodium. Potassium may also be used, either alone or interalloyed with sodium. The alkali metal employed in the examples of this invention is in the form of a fine dispersion in low melting petrolatum. The sodium metal is melted in a nitrogen atmosphere and poured into low melting petrolatum which is held at a temperature above the melting point of the sodium. This mixture is then mixed in an Eppenbach homogenizer for 5 minutes at maximum speed in a nitrogen atmosphere and at a temperature above the melting point of the sodium until the sodium particles reach 2 to 20 microns in size with 10 microns the preferred size.

In polymerizing these mixtures, reasonable care must be taken to exclude moisture and air. The reaction temperature is not critical and may vary from about 30 to 100° C. but 50±10° C. is preferred for ease of control. The container used for this reaction is a pressure vessel with provisions for agitation. The surface of the vessel may be of glass or such common metals as iron, aluminum, tin and stainless steel. Large areas of exposed rubber surfaces, such as gaskets, are preferably to be avoided.

The practice of this invention will be more clearly demonstrated in the following specific examples, although it is to be understood that there are many other forms of the invention and the invention is not limited in any way by the details set forth.

*Example 1*

The following mixture of materials was prepared and subjected to polymerization conditions:

| Materials: | Parts by weight |
|---|---|
| Butadiene-1,3 | 100.0 |
| Pentane | 100.0 |
| Sodium | 0.15 |
| Ethylene glycol monoethyl ether | 0.20 |

These materials are charged to a pressure container and reacted with agitation at 50° C. Conversion is essentially complete in 24 hours. Phenyl-beta-naphthylamine, as an antioxidant, dissolved in benzene is added to the polymer as it is removed from the reaction vessel. The whole mass is then placed on a warm wash mill where the pentane is removed by volatilization. The polymer is then dried overnight in a vacuum oven at 50° C.

This dry polymer, when placed on either a cold or hot two-roll rubber mill, forms a smooth sheet readily and breaks down in a manner characteristic of natural rubber. This resemblance to natural rubber is much more noticeable when compared with sodium polymers prepared with a different modifier, such as dioxane. This hydroxy ether polymer is gell free and easily soluble in the usual rubber solvents such as benzene. Infra-red measurements show 60% 1,2-addition of the butadiene-1,3.

For comparison purposes, a sodium catalyzed polybutadiene was prepared using highly purified dioxane, which acts as a reaction accelerator but produces a polymer that tends to crumble on the mill rolls.

The butadiene polymers made by the sodium catalyzed reaction using both modifiers were compounded to the following recipe on a two-roll, four-inch rubber mill. Recipe:

| Material: | Parts by weight |
|---|---|
| Polymer | 100.0 |
| HMF black | 35.0 |
| Zinc oxide | 5.0 |
| Stearic acid | 3.0 |
| Palm oil | 2.0 |
| Phenyl-beta-naphthylamine | 1.5 |
| Altax | 1.75 |
| Sulfur | 1.75 |

The compounded stock was then cured in a rubber press for 45 minutes at a temperature of 298° F. The cured samples were then tested in a Scott Tensile Tester at room temperature and at 212° F. The data obtained are given in the table below:

| | Control Dioxane Modified polymer, 1 part | Hydroxy ether Modified polymer | |
|---|---|---|---|
| | | 0.1 part | 0.2 part |
| Tensile strength, 77° F., p. s. i | 2,000 | 1,950 | 2,550 |
| Modulus, 77° F., 300% | 1,100 | 1,150 | 950 |
| Elongation, 77° F., percent | 375 | 460 | 460 |
| Tensile strength, 212° F., p. s. i | 500 | 500 | 500 |
| Elongation, 212° F., percent | 275 | 210 | 210 |

All of these sodium polymers are characterized by low hysteresis as measured by the Goodrich Flexometer, and they also have high Yerzley resilience values. Superiority in physical properties of the more uniform hydroxy ether polymer over the dioxane control is apparent in the data given in the table above.

*Example 2*

A mixture of 77 parts of butadiene-1,3, 23 parts of styrene, 100 parts of pentane, 0.15 part of dispersed sodium and 0.2 part of the ethylene glycol monoethyl ether was charged in a pressure autoclave with precautions taken to exclude air and moisture. The batch was heated to 50° C. with agitation. The reaction rate was faster than that of the polybutadiene shown in Example 1 because of the presence of styrene. The polymer product was treated substantially in the same manner as outlined in Example 1.

The polymer product obtained was gell free, tough and rubbery. It had a good appearance, formed grain free films on stretching and processed very much like natural rubber on a two-roll rubber mill.

*Example 3*

100 parts of butadiene, 100 parts of pentane, 0.15 part of sodium, and 0.2 part of tetraethylene glycol were mixed and charged to a pressure reactor with provision for agitation. The mixture was heated to 50° C. and allowed to react for 24 hours. The polymer obtained was treated in substantially the same manner as set forth in Example 1.

The resulting polymer had a good appearance, was uniform and easily soluble in benzene, was tough and rubbery and processed very satisfactorily on both a cold and hot two-roll rubber mill.

*Example 4*

A mixture of 77 parts of butadiene-1,3, 23 parts of styrene, 100 parts of pentane, 0.15 part of sodium and 0.2 part of tetraethylene glycol was charged to a reaction vessel with the usual precautions taken to exclude moisture and air, heated to 50° C. and agitated. This reaction takes place at a faster rate than when butadiene is polymerized alone. The polymer was treated in substantially the same manner as outlined in Example 1.

The polymer product obtained had a good appearance, formed thin grain free films readily on stretching, was gel free and processed satisfactorily on a two-roll rubber mill. The action of this hydroxy ether polymer on the mill was similar to natural rubber.

Although I have specifically described only representative embodiments of my invention, it will be apparent to those skilled in the art that other materials, proportions and polymerization conditions may be employed without departing from the spirit and scope of my invention.

I claim:

1. The method which comprises polymerizing a monomeric hydrocarbon material essentially containing a butadiene-1,3 hydrocarbon with an alkali metal catalyst in the presence of 0.05 to 2.0 parts, based on 100 parts of the polymerizable monomers, of a non-polymerizable hydroxy ether having a molecular weight of less than 1000.

2. The method which comprises polymerizing monomeric hydrocarbons of at least 50 percent by weight of a butadiene-1,3 hydrocarbon with an alkali metal catalyst in an inert saturated hydrocarbon solvent in the presence of 0.05 to 2.0 parts, based on 100 parts of the polymerizable monomers, of a non-polymerizable aliphatic hydroxy ether having a molecular weight less than 1000.

3. The method which comprises polymerizing monomeric hydrocarbons of at least 50 percent by weight of a butadiene-1,3 hydrocarbon with an alkali metal catalyst in an inert saturated hydrocarbon solvent in the presence of 0.05 to 2.0 parts, based on 100 parts of the polymerizable monomers, of a non-polymerizable aromatic hydroxy ether having a molecular weight less than 1000.

4. The method which comprises polymerizing monomeric hydrocarbons of at least 50 percent by weight of a butadiene-1,3 hydrocarbon with an alkali metal catalyst in an inert saturated hydrocarbon solvent in the presence of 0.05 to 2.0 parts, based on 100 parts of the polymerizable monomers, of a polyalkylene glycol having a molecular weight less than 1000.

5. The method which comprises polymerizing monomeric hydrocarbons of at least 50 percent by weight of a butadiene-1,3 hydrocarbon with an alkali metal catalyst in an inert saturated hydrocarbon solvent in the presence of 0.05 to 2.0 parts, based on 100 parts of the polymerizable monomers, of a monosubstituted ether of a polyalkylene glycol having a molecular weight less than 1000.

6. The method which comprises polymerizing monomeric hydrocarbons of at least 50 percent by weight of a butadiene-1,3 hydrocarbon with an alkali metal catalyst in an inert saturated hydrocarbon solvent in the presence of 0.5 to 2.0 parts, based on 100 parts of the polymerizable monomers, of a monoalkyl ether of an alkylene glycol having a molecular weight less than 1000.

7. The method which comprises polymerizing monomeric hydrocarbons of at least 50 percent by weight of a butadiene-1,3 hydrocarbon with an alkali metal catalyst in an inert saturated hydrocarbon solvent in the presence of 0.05 to 2.0 parts, based on 100 parts of the polymerizable monomers, of a polyethylene glycol having a molecular weight less than 1000.

8. The method which comprises polymerizing monomeric hydrocarbons of at least 50 percent by weight of a butadiene-1,3 hydrocarbon with an alkali metal catalyst in an inert saturated hydrocarbon solvent in the presence of 0.05 to 2.0 parts, based on 100 parts of the polymerizable monomers, of a monoalkyl ether of ethylene glycol.

9. The method which comprises polymerizing butadiene-1,3 with sodium in pentane in the presence of 0.05 to 2.0 parts, based on 100 parts of the polymerizable monomers, of tetraethylene glycol.

10. The method which comprises polymerizing butadiene-1,3 with sodium in pentane in the presence of 0.05 to 2.0 parts, based on 100 parts of the polymerizable monomers, of the monoethyl ether of ethylene glycol.

11. The method which comprises polymerizing a monomeric mixture of at least 50 percent butadiene-1,3 and less than 50 percent styrene by weight, with dispersed sodium in pentane in the presence of 0.1 to 0.5 part by weight of tetraethylene glycol.

12. The method which comprises polymerizing a monomeric mixture of at least 50 percent butadiene-1,3 and less than 50 percent styrene by weight, with dispersed sodium in pentane in the presence of 0.1 to 0.5 part by weight of monoethyl ether of ethylene glycol.

13. The method which comprises polymerizing a monomeric hydrocarbon material containing at least 50 percent by weight of a butadiene-1,3 hydrocarbon with an alkali metal catalyst in an inert saturated hydrocarbon solvent in the presence of 0.05 to 2.0 parts, based on 100 parts of the polymerizable monomers, of a hydroxy ether selected from the class consisting of poly alkylene glycols, monosubstituted ethers of alkylene glycols and monosubstituted ethers of polyhydric aryl compounds having a molecular weight less than 1000.

14. The method which comprises polymerizing a monomeric hydrocarbon material containing at least 50 percent by weight of a butadiene-1,3 hydrocarbon with an alkali metal catalyst in an inert saturated hydrocarbon solvent in the presence of 0.05 to 2.0 parts, based on 100 parts of polymerizable monomers, of a monoalkyl ether of a polyhydric alcohol having a molecular weight less than 1000.

References Cited in the file of this patent

FOREIGN PATENTS

| Number | Country | Date |
|---|---|---|
| 283,841 | Great Britain | Apr. 16, 1929 |